(12) United States Patent
Pack, Jr.

(10) Patent No.: US 6,315,323 B1
(45) Date of Patent: Nov. 13, 2001

(54) APPARATUS FOR POSITIONING AN INFLATED AIR BAG

(75) Inventor: Wesley D. Pack, Jr., Gilbert, AZ (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/469,053

(22) Filed: Dec. 21, 1999

(51) Int. Cl.⁷ ............................................. B60R 21/16
(52) U.S. Cl. ............................ 280/743.2; 280/743.1; 280/735
(58) Field of Search .................. 280/735, 743.2, 280/743.1, 733

(56) References Cited

U.S. PATENT DOCUMENTS

| | | |
|---|---|---|
| 3,687,485 | 8/1972 | Campbell . |
| 5,380,038 * | 1/1995 | Hawthorn et al. ............... 280/730 |
| 5,707,075 | 1/1998 | Kraft et al. . |
| 5,931,493 * | 8/1999 | Sutherland ..................... 280/730.1 |
| 5,957,490 * | 9/1999 | Sinnhuber ....................... 280/735 |
| 5,975,566 * | 11/1999 | Bocker et al. .................. 280/730.2 |
| 6,014,602 * | 1/2000 | Kithil et al. ........................ 701/45 |
| 6,029,993 * | 2/2000 | Mueller .......................... 280/730.2 |
| 6,076,854 * | 6/2000 | Schneck et al. ............... 280/743.2 |
| 6,189,928 * | 2/2001 | Sommer et al. ................ 280/743.2 |
| 6,254,130 | 7/2001 | Jayaraman et al. . |

* cited by examiner

*Primary Examiner*—Lanna Mai
*Assistant Examiner*—Christopher Buchanan
(74) *Attorney, Agent, or Firm*—Tarolli, Sundheim, Covell, Tummino & Szabo L.L.P.

(57) ABSTRACT

A vehicle occupant protection apparatus (10) comprises an inflatable device (18) for helping to protect an occupant of a vehicle. At least one tether (82, 84, 86, 88) is connected with the inflatable device (18) to control the location of the inflatable device when inflated. The occupant protection apparatus (10) includes at least one sensor (140) for sensing at least one condition relevant to a determination of where to locate the inflatable device (18) when inflated. The occupant protection apparatus (10) also includes a tether tension control mechanism (102, 104, 106, 108, 120) for tensioning the at least one tether (82, 84, 86, 88) in accordance with the sensing of the at least one condition.

19 Claims, 3 Drawing Sheets

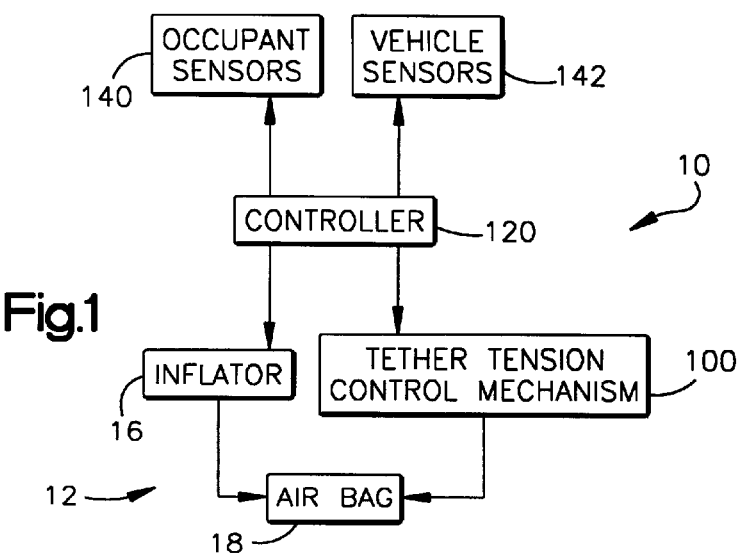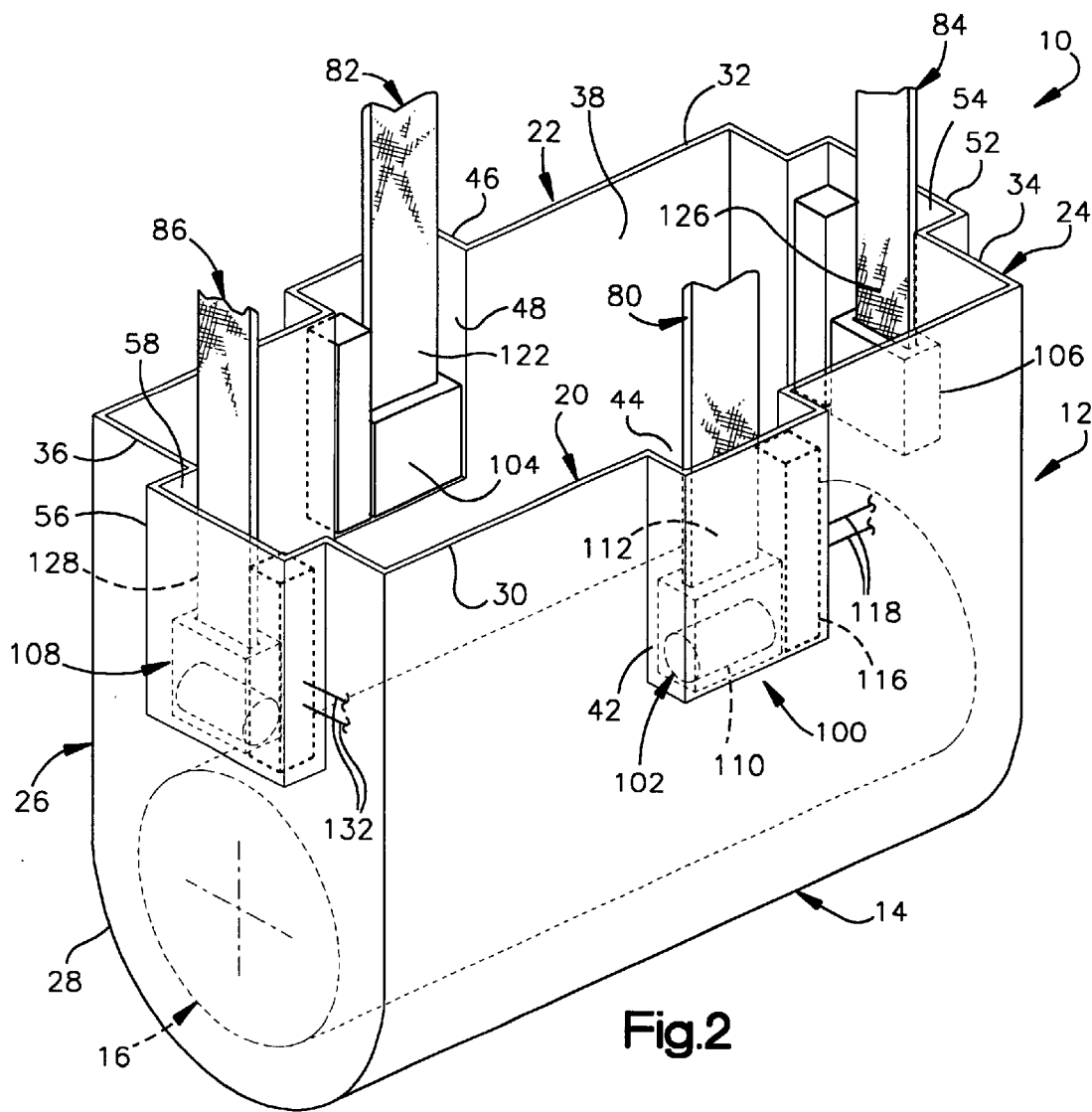

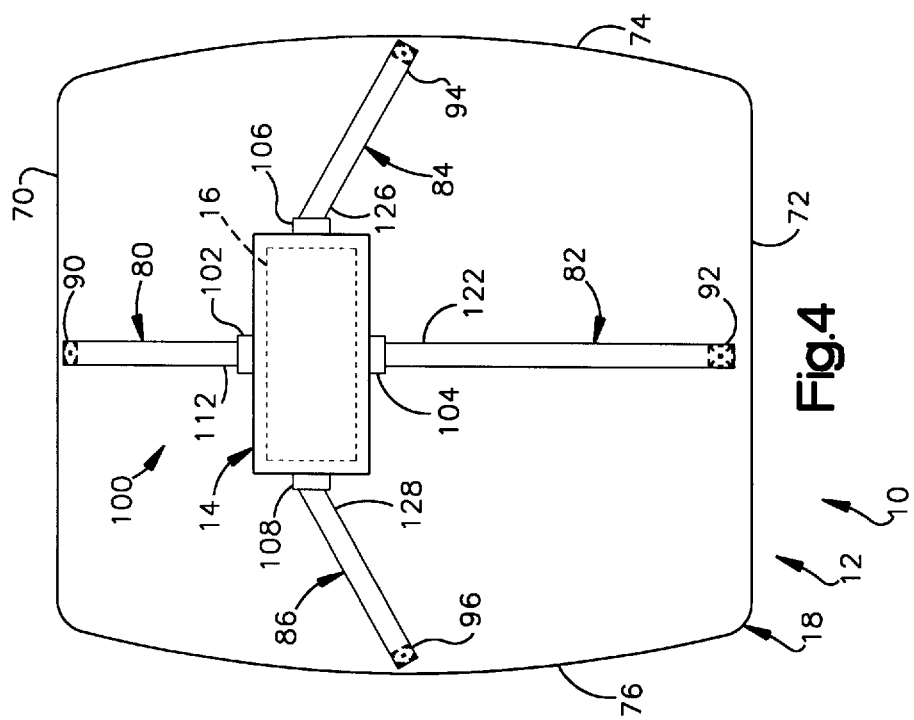
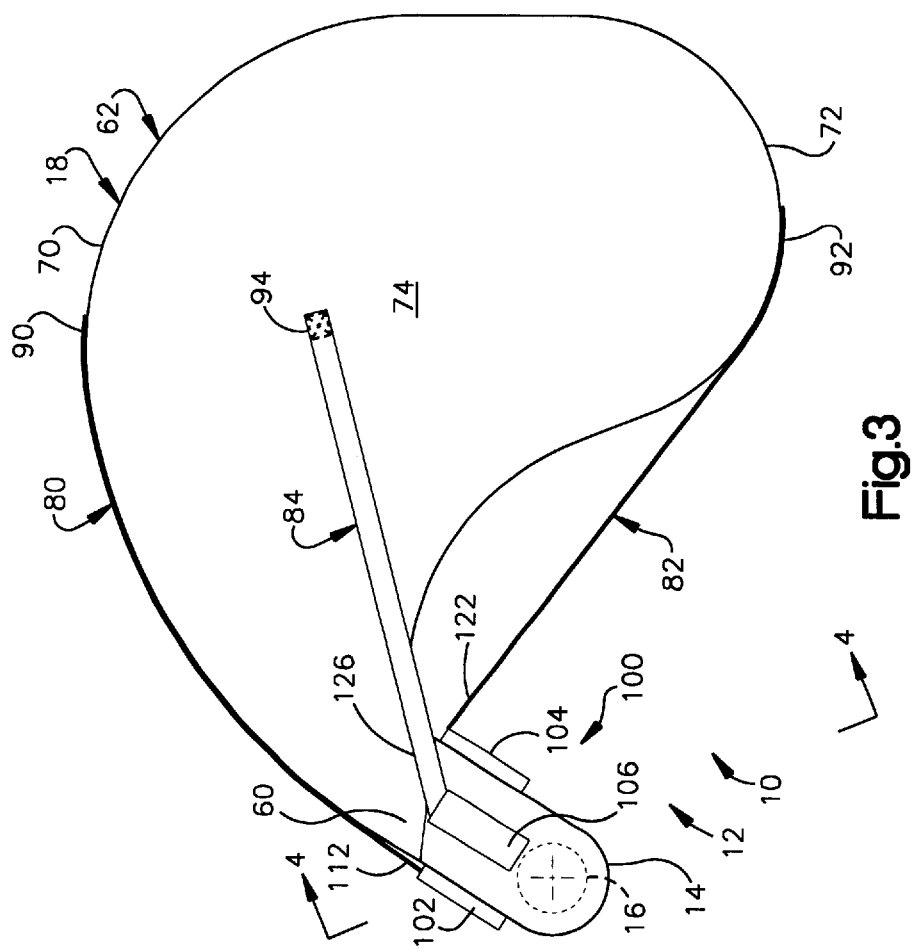

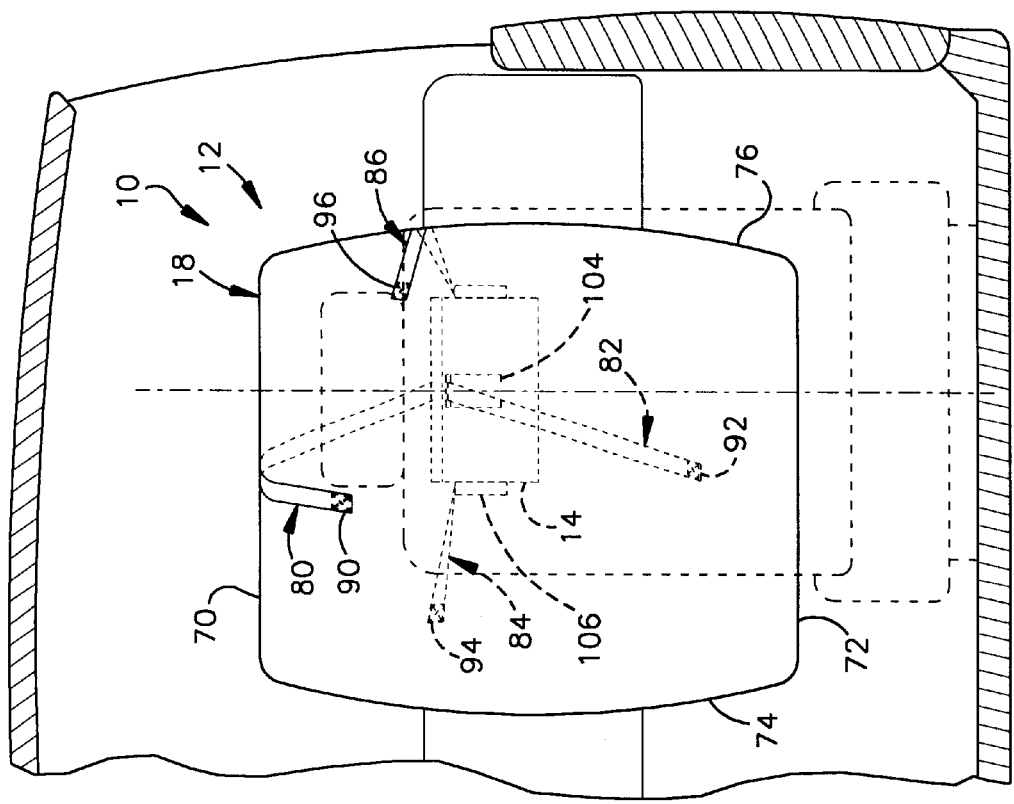
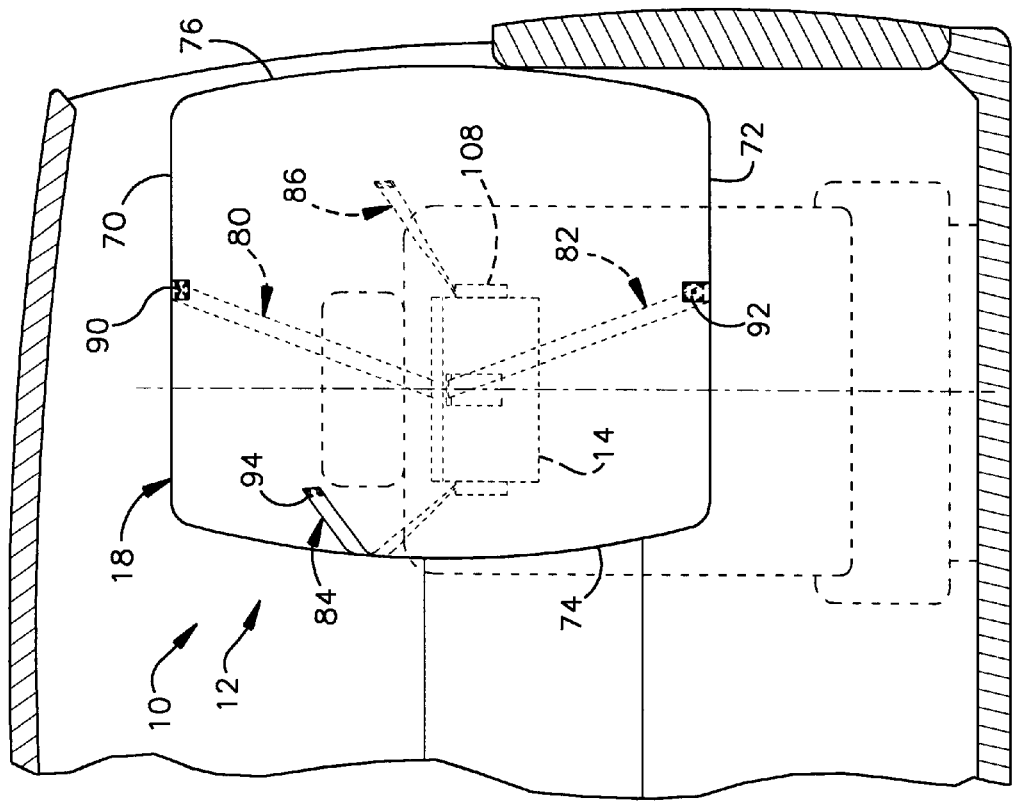

APPARATUS FOR POSITIONING AN INFLATED AIR BAG

BACKGROUND OF THE INVENTION

1. Technical Field

The present invention relates to a vehicle occupant protection apparatus including an inflatable vehicle occupant protection device, such as an air bag. In particular, the present invention relates to a vehicle occupant protection apparatus including an air bag for helping to protect an occupant seated forward in a vehicle seat.

2. Description of the Prior Art

It is known to inflate an air bag to help protect an occupant of a vehicle. The air bag is inflated into a position between the vehicle occupant and a portion of the vehicle such as the steering wheel or instrument panel of the vehicle.

An air bag for a front seat passenger of a vehicle is often designed to extend across a large portion of the width of the front seat of the vehicle in order to accommodate a passenger who may, for example, be leaning forward or to one side or the other, as opposed to sitting back and centered in the front passenger seat of the vehicle. As a result, the front seat passenger air bag is larger than it would need to be were it designed to protect only a passenger who is sitting back in the front passenger seat of the vehicle. This larger air bag requires more material and also requires larger capacity inflator.

SUMMARY OF THE INVENTION

The present invention is a vehicle occupant protection apparatus comprising an inflatable device for helping to protect an occupant of a vehicle. At least one tether is connected with the inflatable device for controlling the location of the inflatable device when inflated. The occupant protection apparatus includes at least one sensor for sensing at least one condition relevant to a determination of where to locate the inflatable device when inflated. The occupant protection apparatus also includes a tether tension control mechanism for tensioning the at least one tether in accordance with the sensing of the at least one condition.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a vehicle occupant protection apparatus constructed in accordance with the present invention and including an inflatable vehicle occupant protection device in the form of an air bag and a tether tension control mechanism;

FIG. 2 is an enlarged perspective view of a portion of the occupant protection apparatus of FIG. 1 including the tether tension control mechanism;

FIG. 3 is a side elevational view of the air bag of the occupant protection apparatus of FIG. 1, shown in an inflated condition;

FIG. 4 is a view taken along generally line 4—4 of FIG. 3;

FIG. 5 is a rear elevational view of the inflated air bag of FIG. 3, shown in a first position; and FIG. 6 is a view similar to FIG. 5 showing the air bag in a second position.

DETAILED DESCRIPTION OF AN EMBODIMENT OF THE INVENTION

The present invention relates to a vehicle occupant protection apparatus including an inflatable vehicle occupant protection device, such as an air bag. In particular, the present invention relates to a vehicle occupant protection apparatus including an air bag for helping to protect an occupant seated forward in a vehicle seat. The present invention can be applied to other types of inflatable occupant protection devices, such as a deployable knee bolster, for example. As representative of the present invention, FIG. 1 illustrates schematically a vehicle occupant protection apparatus 10.

The occupant protection apparatus 10 includes an air bag module 12 mounted in the instrument panel of a vehicle 13 (FIGS. 5 and 6). The air bag module 12 includes an air bag 18, an inflator 16 for inflating the air bag, and a tether tension control mechanism 100 for positioning the air bag when it is inflated.

The air bag module 12 (FIG. 2) includes a container 14 that is preferably made from metal. The container 14 when oriented as shown in FIGS. 4–6 in the vehicle 13 includes upper and lower side walls 20 and 22. The upper and lower side walls 20 and 22 are interconnected by opposite inner and outer side walls 24 and 26 and a curved front wall 28.

The upper and lower side walls 20 and 22 have edge portions 30 and 32, respectively. The inner and outer side walls 24 and 26 have edge portions 34 and 36, respectively. The four edge portions 30–36 of the container 14 define an opening 38 into the container, opposite the curved front wall 28. The opening 38 is presented upward and rearward in the vehicle 13, toward the vehicle occupant compartment.

Each one of the four side walls 20–26 of the container 14 has wall portions defining a respective actuator recess. Specifically, the upper side wall 20 has wall portions 42 that define a generally rectangular actuator recess 44 in the upper side wall. The wall portions 42, and the actuator recess 44, project from the upper side wall 20 in a direction away from the interior of the container 14.

The lower side wall 22 has wall portions 46 that define a generally rectangular actuator recess 48 in the lower side wall. The wall portions 46, and the actuator recess 48, project from the lower side wall 22 in a direction away from the interior of the container 14.

The inner side wall 24 has wall portions 52 that define a generally rectangular actuator recess 54 in the inner side wall. The wall portions 52, and the actuator recess 54, project from the inner side wall 24 in a direction away from the interior of the container 14.

The outer side wall 26 has wall portions 56 that define a generally rectangular actuator recess 58 in the outer side wall. The wall portions 56, and the actuator recess 58, project from the outer side wall 26 in a direction away from the interior of the container 14.

The inflator 16 is a known, electrically actuatable device which, when actuated, provides inflation fluid under pressure for inflating the air bag 18. The inflator 16 has an elongate cylindrical configuration and is located adjacent the curved front wall 28 of the container 14.

The air bag 18 (FIGS. 3–6) is of a known design and includes a mouth portion 60 that is connected to the container 14 in a manner not shown. A body portion 62 of the air bag 18 extends outward from the mouth portion 60 when the air bag is in the inflated condition shown in FIGS. 3–6. The body portion 62 of the air bag 18 includes an upper side portion 70 of the air bag, a lower side portion 72 of the air bag, an inboard or inner side portion 74 of the air bag, and an outboard or outer side portion 76 of the air bag.

The occupant protection apparatus 10 includes a plurality of tethers 80, 82, 84, and 86 (FIGS. 2–6) for locating or positioning the air bag 18 when inflated. Each one of the tethers 80–86 is made from a light weight but strong material, such as woven nylon. Each one of the tethers 80–86 is configured as a strap that extends from the canister 14 to the body portion 62 of the air bag 18.

The upper tether 80 (FIG. 2) extends from the actuator recess 44 on the upper side wall 20 of the container 14. An outer end portion 90 (FIGS. 3 and 4) of the upper tether 80 is sewn to the upper side portion 70 of the air bag 18, at a location past the midpoint of the upper side portion of the air bag.

The lower tether 82 (FIG. 2) extends from the actuator recess 48 on the lower side wall 22 of the container 14. An outer end portion 92 (FIGS. 3 and 4) of the lower tether 82 is sewn to the lower side portion 72 of the air bag 18, at a location past the midpoint of the lower side portion of the air bag.

The inboard or inner tether 84 (FIG. 2) extends from the actuator recess 54 on the inner side wall 24 of the container 14. An outer end portion 94 (FIGS. 3 and 4) of the inner tether 84 is sewn to the inner side portion 74 of the air bag 18, at a location past the midpoint of the inner side portion of the air bag.

The outboard or outer tether 86 (FIG. 2) extends from the actuator recess 58 on the outer side wall 26 of the container 14. An outer end portion 96 (FIG. 4) of the outer tether 80 is sewn to the outer side portion 76 of the air bag 18, at a location past the midpoint of the outer side portion of the air bag.

The tether tension control mechanism 100 includes four independently actuatable actuators 102, 104, 106, and 108 (FIGS. 2–6). The upper tether actuator 102 (FIG. 2) is a known device, such as a retractor or pretensioner, that includes a rotatable spool 110 on which an inner end portion 112 of the upper tether 80 is wound. A spool rotation mechanism (shown schematically at 116) includes a gear fixed to the spool for rotation with the spool. The gear is in meshing engagement with a rack. The rack is fixed for sliding movement with a piston. The piston is movable upon actuation of a pyrotechnic charge. The pyrotechnic charge is electrically actuatable over lead wires 118. The lead wires 118 are connected with vehicle electric circuitry including a controller 120, described below in detail.

Each one of the other three actuators 104, 106 and 108 is identical in construction and operation to the upper tether actuator 102. The lower tether actuator 104 is connected with an inner end portion 122 of the lower tether 82 and is electrically actuatable to wind up and thereby tension the lower tether. The inboard or inner tether actuator 106 is connected with an inner end portion 126 of the inner tether 84 and is electrically actuatable to wind up and thereby tension the inner tether. The outboard or outer tether actuator 108 is connected with an inner end portion 128 of the outer tether 86 and is electrically actuatable via lead wires 132 to wind up and thereby tension the outer tether.

The vehicle occupant protection apparatus 10 also includes one or more occupant condition sensors indicated schematically at 140 (FIG. 1). The occupant condition sensors 140 may be any of several known types that are operative to sense the position of the vehicle occupant relative to the instrument panel. For example, the occupant condition sensors 140 can sense the relative inboard or outboard position of the occupant in the vehicle, and can also sense the height of the occupant or whether the occupant is closer to or farther from the instrument panel. The occupant condition sensors 140 provide an appropriate output signal to the controller 120.

The vehicle occupant protection apparatus 10 also includes one or more vehicle condition sensors 142. The vehicle condition sensors 142 may be any of several known types. For example, one of the vehicle condition sensors 142 may be a deceleration sensor such as a mechanical inertia switch or an electrical accelerometer. One of the vehicle condition sensors 142 may also be a proximity sensor such as a radar unit that senses the distance between the vehicle 10 and an object in front of the vehicle. The vehicle condition sensors 142 provide an appropriate output signal to the controller 120.

The controller 120, which is preferably a microprocessor, is operatively connected to the occupant condition sensors 140, to the vehicle condition sensors 142, and to the four actuators 102–108. The controller 120 incorporates one or more algorithms known in the art for determining the position of the occupant in the vehicle and, in response, controlling actuation of the actuators 102–108, as described below.

The controller 120 also incorporates one of several crash algorithms known in the art for discriminating between deployment and non-deployment crash conditions and determining whether to deploy the air bag 18. Specifically, in the event of a deployment crash condition involving sudden vehicle deceleration, or other event for which protection of the vehicle occupant may be desired, the sensors 140 and 142 provide appropriate output signals that are inputs to the controller 120. The controller 120 compares the outputs of the sensors 140 and 142 with outputs found in a look-up table, for example. Depending on the outcome of this comparison, the controller 120 determines whether or not to actuate the inflator 16 and deploy the air bag 18.

During inflation of the air bag 18, the controller 120 controls the operation of the tether tension control mechanism 100 in response to the outputs of the occupant condition sensors 142. Control of the tether tension control mechanism 100 is responsive to the position of the vehicle occupant. It may also be responsive to the size or weight of the occupant, or to any other factor that may be useful in determining where the air bag 18 should be located upon inflation.

For example, if the occupant is determined to be positioned relatively far outboard in the vehicle 13, then upon actuation of the inflator 16, the controller 120 can energize the outer tether actuator 108 while not energizing any of the other three actuators 102–106. Energizing the outer tether actuator 108 causes the spool of the outer tether actuator to rotate in a direction so as to wind up or retract at least a portion of the outer tether 86, thus shortening and tensioning the outer tether. The shortening and tensioning of the outer tether 86 prevents the outer side portion 76 of the air bag 18 from moving fully in a direction away from the container 14. As a result, the inflating air bag 18 is caused to inflate in a more outboard direction in the vehicle 13 to help protect the occupant. Such positioning of the air bag 18 is illustrated in FIG. 5.

If the occupant is determined to be relatively tall, the controller 120 can energize the upper tether actuator 102. Energizing the upper tether actuator 102 causes the spool 110 of the upper actuator to rotate in a direction so as to wind up or retract at least a portion of the upper tether 80, thus shortening and tensioning the upper tether. The shortening and tensioning of the upper tether 80 prevents the upper side portion 70 of the air bag 18 from moving fully in a direction away from the container 14. As a result, the inflating air bag 18 is caused to inflate in a more upward direction in the vehicle 13 to help protect the occupant. Such positioning of the air bag 18 is illustrated in FIG. 5.

In a similar manner, if the occupant is determined to be positioned relatively far inboard in the vehicle 13, the controller 120 can energize the inner tether actuator 106, thus shortening and tensioning the inner tether 84. The tensioning and shortening of the inner tether 84 causes the inflating air bag 18 to inflate in a more inboard direction in the vehicle 13 to help protect the occupant. If the occupant is determined to be relatively short, the controller can energize the lower tether actuator 104, causing the air bag 18 to inflate in a more downward direction in the vehicle 13. Such positioning of the air bag 18 is illustrated in FIG. 6.

Because the air bag 18, when inflated, can be positioned laterally to protect an occupant not centered in the vehicle seat 10, the air bag need not be large enough to cover simultaneously both an inboard and an outboard position of the vehicle occupant. Similarly, because the air bag 18 can be positioned vertically when inflated, the air bag can be made with a smaller vertical extent. In addition, the inflator 16 can have a reduced capacity and thus can be made smaller and lighter.

From the above description of the invention, those skilled in the art will perceive improvements, changes and modifications in the invention. For example, a different number of tethers, rather than four, can be provided. Also, the attachment points of the tethers to the canister and to the air bag can be varied to provide different control characteristics. Such improvements, changes and modifications within the skill of the art are intended to be covered by the appended claims.

Having described the invention, I claim:

1. A vehicle occupant protection apparatus comprising:
   an inflatable device for helping to protect an occupant of a vehicle;
   an inflator for inflating said inflatable device;
   at least one tether connected with said inflatable device for applying force to said inflatable device during inflation which force controls the location of said inflatable device when inflated;
   at least one sensor for sensing at least one condition relevant to a determination of where to locate said inflatable device when inflated; and
   a tether tension control mechanism responsive to said sensor for tensioning said at least one tether in accordance with said sensing of said at least one condition to cause said tether to apply said force by shortening which controls the location of said inflatable device when inflated.

2. An apparatus as set forth in claim 1 wherein said inflatable device has an inboard portion and an outboard portion, and wherein said at least one tether comprises an inboard tether connected with said inboard portion of said inflatable device.

3. An apparatus as set forth in claim 1 wherein said inflatable device has an inboard portion and an outboard portion, and wherein said at least one tether comprises an outboard tether connected with said outboard portion of said inflatable device.

4. An apparatus as set forth in claim 1 comprising a container for said air bag, said air bag having a mouth portion attached to said container and a body portion, said tether comprising a strap that extends from said container to said body portion of said air bag and that is shortened and tensioned by said tether tension control mechanism to cause said tether to apply said force which controls the location of said inflatable device when inflated.

5. An apparatus as set forth in claim 1 wherein said tether tension control mechanism comprises an actuatable pyrotechnic device.

6. An apparatus as set forth in claim 5 further comprising a controller operatively connected with said at least one sensor for controlling actuation of said pyrotechnic device.

7. An apparatus as set forth in claim 1 wherein said tether tension control mechanism comprises at least one electrically actuatable tensioning device for tensioning said tether to cause said tether to apply said force which controls the location of said inflatable device when inflated and said occupant protection apparatus comprises a controller operatively connected with said at least one sensor for controlling actuation of said tensioning device in accordance with said sensing of said at least one condition.

8. An apparatus as set forth in claim 7 wherein said at least one condition is occupant position.

9. An apparatus as set forth in claim 7 wherein said tether tension control mechanism comprises an actuator having a rotatable spool on which said at least one tether is windable to shorten and thereby tension said at least one tether.

10. An apparatus as set forth in claim 1 wherein said at least one tether is disposed outside of said inflatable device.

11. An apparatus as set forth in claim 1 wherein said at least one tether comprises a plurality of tethers connected with said inflatable device, said tether tension control mechanism tensioning said plurality of tethers in accordance with said sensing of said at least one condition.

12. An apparatus as set forth in claim 11 wherein said tether tension control mechanism comprises a plurality of individually actuatable tensioning devices associated with said plurality of tethers, and further comprising vehicle electric circuitry responsive to said at least one sensor for selectively actuating one or more of said tensioning devices.

13. An apparatus as set forth in claim 12 wherein each one of said tensioning devices comprises an actuatable pyrotechnic device.

14. An apparatus as set forth in claim 13 further comprising a controller operatively connected with said at least one sensor for controlling actuation of said tensioning devices.

15. An apparatus as set forth in claim 11 wherein said inflatable device has an inboard portion and an outboard portion, and wherein said plurality of tethers comprises an inboard tether connected with said inboard portion of said inflatable device and an outboard tether connected with said outboard portion of said inflatable device.

16. An apparatus as set forth in claim 15 wherein said tether tension control mechanism comprises a first tensioning device associated with said inboard tether and a second tensioning device associated with said outboard tether, said second tensioning device being actuatable independently of said first tensioning device.

17. A vehicle occupant protection apparatus comprising:
   an inflatable device having a deflated condition and having an inflated condition for helping to protect an occupant of a vehicle;
   an actuatable inflator for inflating said inflatable device;
   a plurality of tethers connected with said inflatable device at spaced apart locations; and
   a tether tension control mechanism actuatable independently of said inflator for varying the location of said inflatable device when inflated by controlling the tensioning of said plurality of tethers by shortening at least one of said plurality of tethers.

18. An apparatus as set forth in claim 17 wherein said tether tension control mechanism comprises a plurality of electrically actuatable tensioning devices associated one with each tether, said apparatus further comprising a condition sensor for sensing at least one condition and a controller operatively connected with said sensor for controlling actuation of said tensioning devices in accordance with said sensing of at least one condition.

19. An apparatus as set forth in claim 18 wherein said sensed condition is occupant position.

* * * * *